United States Patent [19]
Fleishman

[11] 3,848,906
[45] Nov. 19, 1974

[54] DISPOSABLE TONGS

[76] Inventor: Seymour Fleishman, 857 W. Belden Ave., Chicago, Ill. 60614

[22] Filed: Feb. 23, 1973

[21] Appl. No.: 335,233

[52] U.S. Cl................... 294/1 R, 15/257.6, 294/16
[51] Int. Cl............................................. A47l 13/52
[58] Field of Search........ 294/1 R, 16, 28, 25, 19 R, 294/33, 55, 106; 15/257.1, 257.6; 119/1; 229/3.5

[56] References Cited
UNITED STATES PATENTS

| | | | |
|---|---|---|---|
| 3,214,210 | 10/1965 | Keirn | 294/16 |
| 3,259,415 | 7/1966 | Howard | 294/16 |
| 3,331,626 | 7/1967 | Kaufman | 294/16 |
| 3,407,927 | 10/1968 | Jones | 294/25 X |
| 3,685,088 | 8/1972 | Doherty | 294/1 R X |
| 3,738,697 | 6/1973 | Kahan | 294/19 R |

Primary Examiner—Evon C. Blunk
Assistant Examiner—Johnny D. Cherry
Attorney, Agent, or Firm—Max R. Kraus

[57] ABSTRACT

Disposable tongs formed of a single blank of sheet material such as cardboard or the like and folded to form a pair of handle engaging members with jaw members at the lower ends thereof so that it can be used by a person for picking up animal excrement or other objects without touching same, said device being so inexpensive to produce that it may be disposed of after each use.

1 Claim, 5 Drawing Figures

DISPOSABLE TONGS

BRIEF SUMMARY OF THE INVENTION

It is recognized that the excrement of pets such as dogs and the like which is deposited on the sidewalks and streets not only creates an unsightly environment but presents a health hazard and is extremely objectionable to those who walk in that area. As a consequence many urban areas are attempting to pass an ordinance which would require that the owner of a pet remove the excrement. An object of this invention therefore is to provide a very simple and inexpensive tongs formed of a single sheet of blank material such as cardboard or the like which is folded to form a pair of handle engaging members and jaw members at the lower end so that it can be operated to pick up the excrement or fecal matter and place it in a disposable bag, which matter, tongs and bag can be disposed of. Thus, this invention envisions tongs having a one-time use. The excrement or fecal matter may thus be picked up by the use of the tongs and disposed of without the person's hand touching the excrement.

Another object of this invention is to provide disposable tongs which has means struck out of the blank from which same is made to provide a spring action which serves normally to spread the tong members with respect to each other.

Another object of this invention is to provide disposable tongs having a one-time use and which may be inexpensively produced.

The disposable tongs is formed from a single sheet of blank material such as cardboard or the like, generally indicated at 10, which in its unfolded form is of generally rectangular shape and same is centrally scored and folded as at 12 to form a pair of tong members or sides 14 which remain hingedly connected together at the top along their fold line 12. Spaced from the bottom edge 16 of each of said members 14 is a transversely extending score line which forms a fold line 18 so that the segment 20 of the blank below the fold or score line 18 forms the jaw for each of said tong members. The jaw segment 20 is inclined inwardly with respect to the longitudinal axis of the upper side portion so that the opposite jaw members are inclined towards each other for the purpose of facilitating the grasping of the excrement or fecal matter. If desired, the lower ends of the jaw members may be serrated or provided with teeth which may be formed in said jaw segments in the forming operation.

Figure 1:
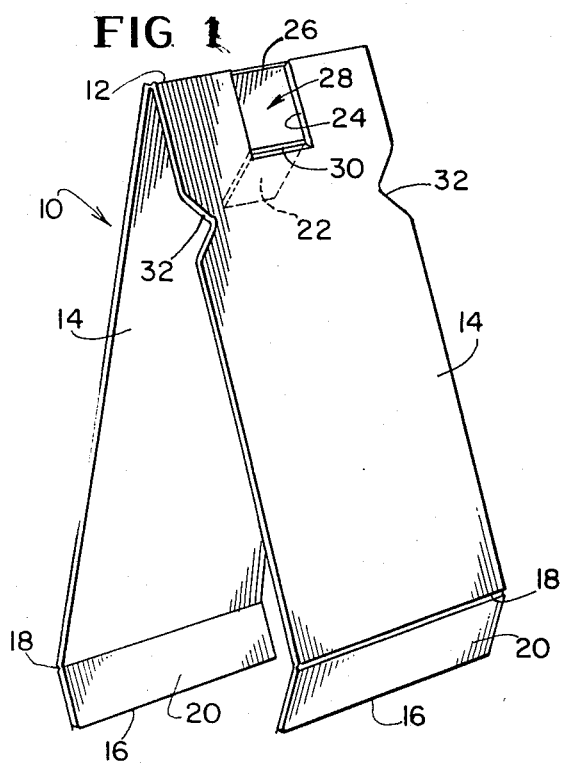
FIG. 1 is a perspective view of the tongs forming the subject matter of this invention which is folded and formed from a single blank of cardboard material.
Figure 4:
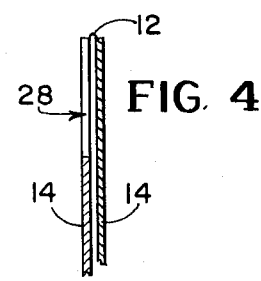
FIG. 4 is a sectional view taken on line 4—4 of FIG. 3.
Figure 5:
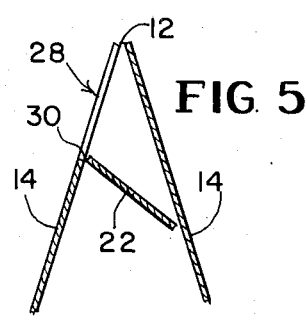
FIG. 5 is a sectional view taken on line 5—5 of FIG. 3 and showing the action of the folded flap in maintaining the sides in spaced relation.

One of the side or tong members 14 has a hinged flap or tongue 22 struck therefrom in the blanking operation, which is formed from the side member 14 by cutting along the opposite sides 24 and top thereof 26 so that a cutout 28 is formed when the flap or tongue 22 is folded along the scored line 30 which is the hinge line, so that the flap extends inwardly in an inclined plane in the direction of the opposite member. This is best shown in FIGS. 1 and 5. When the flap or tongue 22 extends in the direction of the opposite member 14 it engages said member and said flap or tongue serves in effect to provide a spring action which urges the two members 14 to be spaced from each other when no manual pressure is applied against the two members. That is, when the two members are not manually engaged they will be hinged in a spaced relation, as shown in FIGS. 1 and 5.

One of the side members 14 is also provided with a pair of spaced cutouts 32 extending inwardly of the side edges, which cutouts are generally of V-shaped configuration. Said cutouts serve to permit the fingers of the hand to be received in said cutouts so that the tongs may be more easily gripped when being held. If desired, cutouts may be formed in the other side member 14 in lieu of that shown for the same purpose, or the opposite side edges of one or both of the tong members 14 may be provided with serrations for a portion of the length of the tong members particularly adjacent the top so that the fingers and thumb will have a better gripping surface along said edges.

Figure 2:
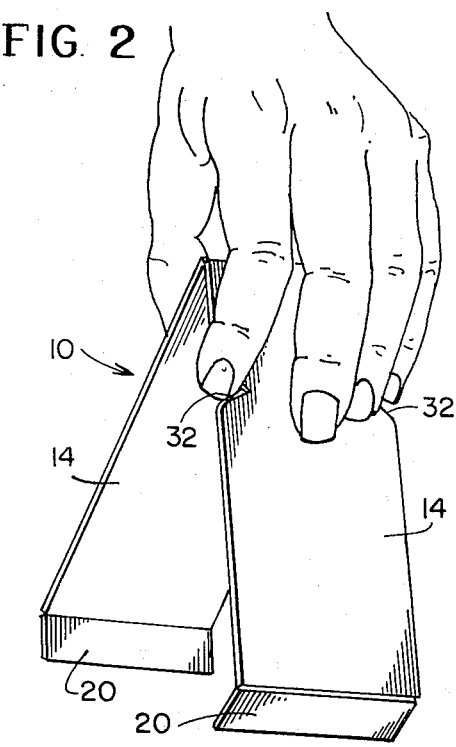
FIG. 2 is a perspective view of the tongs showing the manner in which same is held in the hand for the purpose of picking up excrement or fecal matter.
Figure 3:
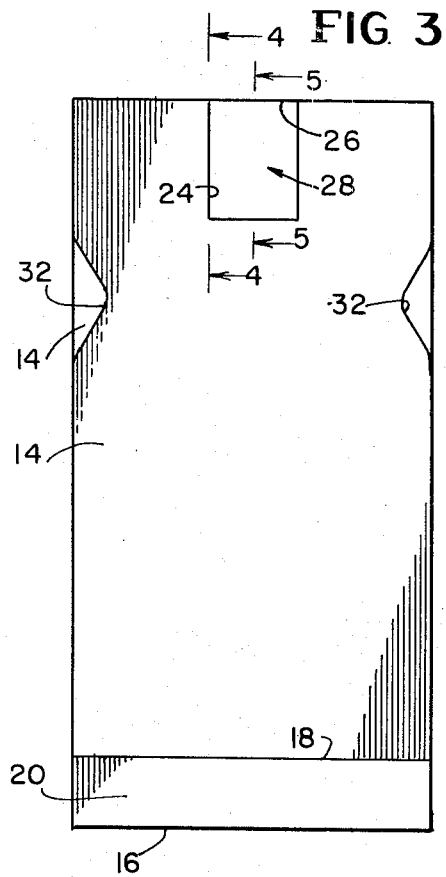
FIG. 3 is an elevational view of one of said members forming the tongs.

The tongs may be manually engaged, as shown in FIG. 2, by the fingers of the hand engaging one side member 14 and the thumb engaging the other side member 14 and the tongs may be manipulated by manual pressure so that the jaws 20 grasp the fecal matter or excrement and hold it between said jaws until the matter and the tongs are deposited in a bag for disposal. If desired the same tongs may be repeatedly used for a particular application and then disposed of. Thus, in effect, while the tongs may be repeatedly used in a single instance, the purpose is to dispose of the tongs and not keep it for subsequent use. This invention thus provides for a very simple article formed from inexpensive material and would require very little tooling for blanking out the forms as herein provided.

What is claimed is:

1. Disposable tongs which are adapted to pick up animal excrement and are formed of a single sheet of material, such as cardboard or the like of generally rectangular shape, having a single central transversely extending straight score line and folded on said score line to form a first hinge line and form a pair of side members which are hingedly connected at said first fold hinge line, said first fold line forming a sharp pointed top fold edge with said side members being flat and extending downwardly and away from each other in opposite angular directions from said sharp pointed top fold edge hinge line, each said flat side member having a bottom edge and a transversely extending score line spaced upwardly of the bottom edge to form a second fold hinge and defining a jaw segment between said bottom edge and said second fold hinge line with each said jaw segment being inclined and sloping downwardly and inwardly at an angle with respect to the longitudinal axis of the side member and inclined towards the opposite jaw segment, and hingeable at said second fold hinge line, each said jaw segment being flat and non-curvilinear and with each of said side members adapted to be directly manually engaged and moved towards each other so that the jaw segments may grasp and hold the material or matter to be engaged by said tongs, with said jaw segments yielding or hinging on said second hinge line as said side members are urged towards each other, one of said side members having a tongue struck out of a side thereof to engage the other side member to space the said side members from each other in normal position, and at least one of said side members having cutouts to permit gripping engagement by the fingers of the hand.

* * * * *